(12) United States Patent
McClure et al.

(10) Patent No.: US 7,330,956 B1
(45) Date of Patent: Feb. 12, 2008

(54) BUCKET BASED MEMORY ALLOCATION

(75) Inventors: Steven T. McClure, Northboro, MA (US); Steven R. Chalmer, Weston, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 192 days.

(21) Appl. No.: 10/123,661

(22) Filed: Apr. 16, 2002

(51) Int. Cl.
*G06F 12/02* (2006.01)

(52) U.S. Cl. ..................................... 711/171

(58) Field of Classification Search ........ 711/170–173, 711/104, 105; 718/104
See application file for complete search history.

(56) References Cited

U.S. PATENT DOCUMENTS

| | | | |
|---|---|---|---|
| 5,206,939 A | 4/1993 | Yanai et al. | |
| 5,469,559 A * | 11/1995 | Parks et al. | 711/106 |
| 5,561,786 A * | 10/1996 | Morse | 711/170 |
| 5,577,243 A * | 11/1996 | Sherwood et al. | 707/7 |
| 5,623,654 A * | 4/1997 | Peterman | 707/206 |
| 5,778,394 A | 7/1998 | Galtzur et al. | |
| 5,784,699 A * | 7/1998 | McMahon et al. | 711/171 |
| 5,845,147 A | 12/1998 | Vishlitzky et al. | |
| 5,857,208 A * | 1/1999 | Ofek | 707/204 |
| 6,219,772 B1 | 4/2001 | Gadangi et al. | 711/170 |
| 6,427,195 B1 * | 7/2002 | McGowen et al. | 711/153 |
| 6,446,183 B1 * | 9/2002 | Challenger et al. | 711/170 |
| 6,490,670 B1 * | 12/2002 | Collins et al. | 711/173 |
| 6,539,464 B1 * | 3/2003 | Getov | 711/170 |
| 6,640,290 B1 * | 10/2003 | Forin et al. | 711/156 |
| 6,757,802 B2 * | 6/2004 | Trainin et al. | 711/170 |
| 6,779,084 B2 * | 8/2004 | Wolrich et al. | 711/118 |
| 2002/0144073 A1 * | 10/2002 | Trainin et al. | 711/170 |
| 2002/0161982 A1 * | 10/2002 | Riedel | 711/170 |

OTHER PUBLICATIONS

Iyengar, "Scalability of Dynamic Storage Allocation Algorithms," IEEE 1088-4955/96, 1996, pp. 223-232.*

* cited by examiner

*Primary Examiner*—Matthew Kim
*Assistant Examiner*—Shane M Thomas
(74) *Attorney, Agent, or Firm*—Muirhead and Saturnelli, LLC (57) ABSTRACT

Managing memory includes subdividing the memory into a first set of blocks corresponding to a first size and a second set of blocks corresponding to a second size that is greater than said first size, in response to a request for an amount of memory that is less than or equal to the first size, providing one of the first set of blocks, and, in response to a request for an amount of memory that is greater than the first size and less than or equal to the second size, providing one of the second set of blocks. Subdividing the memory may also include subdividing the memory into a plurality of sets of blocks, where each particular set contains blocks corresponding to one size that is different from that of blocks not in the particular set. Each set of blocks may correspond to a size that is a multiple of a predetermined value. Managing memory may also include providing a table containing an entry for each set of blocks. The entry for each set of blocks may be a pointer to one of: an unused block and null. Unused blocks of a set may be linked together to form a linked list where the pointer for each entry in the table points to the first block in the list.

20 Claims, 9 Drawing Sheets

BUCKET BASED MEMORY ALLOCATION

BACKGROUND OF THE INVENTION

1. Technical Field

This application relates to the field of memory management, and more particularly to the field of managing dynamically allocated computer memory.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

The host adapters, disk adapters, and other internal components of the storage device (such as RDF adapters, RA's) may each have their own local processor and operating system. Each request to an internal component of the storage device may be scheduled as a task that is serviced by the operating system of the internal component. In some cases, a task may temporarily need a block of memory for its processing. In those cases, it may be useful for the operating system to be able to dynamically obtain and release blocks of memory for temporary usage by the tasks. Conventionally, the available, unused, memory is maintained in a heap, and an operating system services memory requests by returning a portion of the heap memory to the requesting task. Once the requesting task has used the memory, the task calls a routine to return the memory to the heap.

In some cases, repeatedly requesting and returning memory from and to the heap results in "heap fragmentation", where the heap memory is separated into a plurality of small portions such that it becomes difficult or impossible to service a request for a relatively large contiguous block of memory. In such cases, it may be necessary to perform a heap compaction to concatenate the plurality of small portions of memory in the heap. However, the need to perform periodic heap compactions adds overhead to the system. In addition, obtaining memory from a heap, especially a fragmented heap, adds overhead, as does the process of returning memory to the heap.

It is desirable to be able to perform dynamic memory allocation and deallocation in a way that reduces the possibility of a fragmented heap, decreases the instances of the heap becoming fragmented, and generally reduces the overhead associated with dynamically requesting and releasing blocks of memory.

SUMMARY OF THE INVENTION

According to the present invention, managing memory includes subdividing the memory into a first set of blocks corresponding to a first size and a second set of blocks corresponding to a second size that is greater than said first size, in response to a request for an amount of memory that is less than or equal to the first size, providing one of said first set of blocks, and, in response to a request for an amount of memory that is greater than the first size and less than or equal to the second size, providing one of the second set of blocks. Subdividing the memory may also include subdividing the memory into a plurality of sets of blocks, where each particular set contains blocks corresponding to one size that is different from that of blocks not in the particular set. Each set of blocks may correspond to a size that is a multiple of a predetermined value. Managing memory may also include providing a table containing an entry for each set of blocks. The table may be stored in a first memory and the blocks may be stored in a second memory. The first and second memories may have different access rates. The entry for each set of blocks may be a pointer to one of: an unused block and null. Unused blocks of a set may be linked together to form a linked list where the pointer for each entry in the table points to the first block in the list. The predetermined value may be $2^n$, where n is an integer. The predetermined value may be eight. The table may include one entry for each multiple of corresponding block sizes. The table may be indexed by subtracting one from the amount of memory requested and then shifting the result right n places. Managing memory may also include, in response to a request for an amount of memory corresponding to a particular set of blocks for which there are no unused blocks, requesting a block of memory from a heap. Managing memory may also include, in response to there being no block of memory from the heap corresponding to the request, returning all unused blocks of memory to the heap. Managing memory may also include, following returning all unused blocks to the heap, requesting a block of memory from the heap. The blocks may contain a section in which user data is stored. Each of the first and second sets of blocks may contain a pointer to a different block of memory in which user data is stored. The different block of memory may have a different access time than memory used for the first and second blocks. Managing memory may also include, in response to a request for an amount of memory corresponding to a particular set of blocks for which there are no unused blocks, requesting a first block of memory from a first heap for the particular one of the set of blocks and requesting a second block of memory from a second heap for a corresponding one of the different blocks of memory in which user data is stored. The first heap may be different from the second heap or the first heap may be the same as the second heap. Managing memory may also include, in response to there being no blocks of memory from both the first heap and the second heap corresponding to the request, returning all unused blocks of memory to the heaps. Managing memory may also include, following returning all unused blocks to the heaps, requesting a block of memory from the heaps.

According further to the present invention, a computer program product includes executable code that subdivides the memory into a first set of blocks corresponding to a first size and a second set of blocks corresponding to a second size that is greater than the first size, executable code that provides one of said first set of blocks in response to a request for an amount of memory that is less than or equal to the first size, and executable code that provides one of the second set of blocks in response to a request for an amount of memory that is greater than the first size and less than or equal to the second size. The executable code that subdivides the memory may subdivide the memory into a plurality of sets of blocks, where each particular set contains blocks corresponding to one size that is different from that of blocks not in the particular set. Each set of blocks may correspond to a size that is a multiple of a predetermined value. The predetermined value may be $2^n$, where n is an integer. The predetermined value may be eight. The computer program product may also include executable code that requests a block of memory from a heap in response to a request for an amount of memory corresponding to a particular set of blocks for which there are no unused blocks. The computer program product may also include executable code that returns all unused blocks of memory to the heap in response to there being no block of memory from the heap corresponding to the request. The computer program product may also include executable code that requests a block of memory from the heap following returning all unused blocks to the heap. The blocks may contain a section in which user data is stored. Each of the first and second sets of blocks may contain a pointer to a different block of memory in which user data is stored. The computer program product may further include executable code that requests a first block of memory from a first heap for the particular one of the set of blocks and requests a second block of memory from a second heap for a corresponding one of the different blocks of memory in which user data is stored in response to a request for an amount of memory corresponding to a particular set of blocks for which there are no unused blocks. The first heap may be different from the second heap or may be the same as the second heap. The computer program product may also include executable code that returns all unused blocks of memory to the heaps in response to there being no blocks of memory from both the first heap and the second heap corresponding to the request. The computer program product may also include executable code that requests a block of memory from the heaps following returning all unused blocks to the heaps.

According further to the present invention, a data storage device includes a plurality of disk drives, a plurality of disk adapters coupled to the disk drives and to a common data bus, a plurality of host adapters that communicate with host computers to send and receive data to and from the disk drives via the common bus and at least one remote communications adapter that communicates with other storage devices, wherein at least one of the disk adapters, host adapters, and the at least one remote communications adapter includes an operating system that performs the steps of subdividing the memory in a first set of blocks corresponding to a first size and a second set of blocks corresponding to a second size that is greater than said first size, in response to a request for an amount of memory that is less than or equal to the first size, providing one of said first set of blocks, and, in response to a request for an amount of memory that is greater than the first size and less than or equal to the second size, providing one of said second set of blocks. The blocks may contain a section in which user data is stored. Each of the first and second sets of blocks may contain a pointer to a different block of memory in which user data is stored. In response to a request for an amount of memory corresponding to a particular set of blocks for which there are no unused blocks, the operating system may request a first block of memory from a first heap for the particular one of the set of blocks and request a second block of memory from a second heap for a corresponding one of the different blocks of memory in which user data is stored.

DETAILED DESCRIPTION OF VARIOUS EMBODIMENTS

Figure 1:
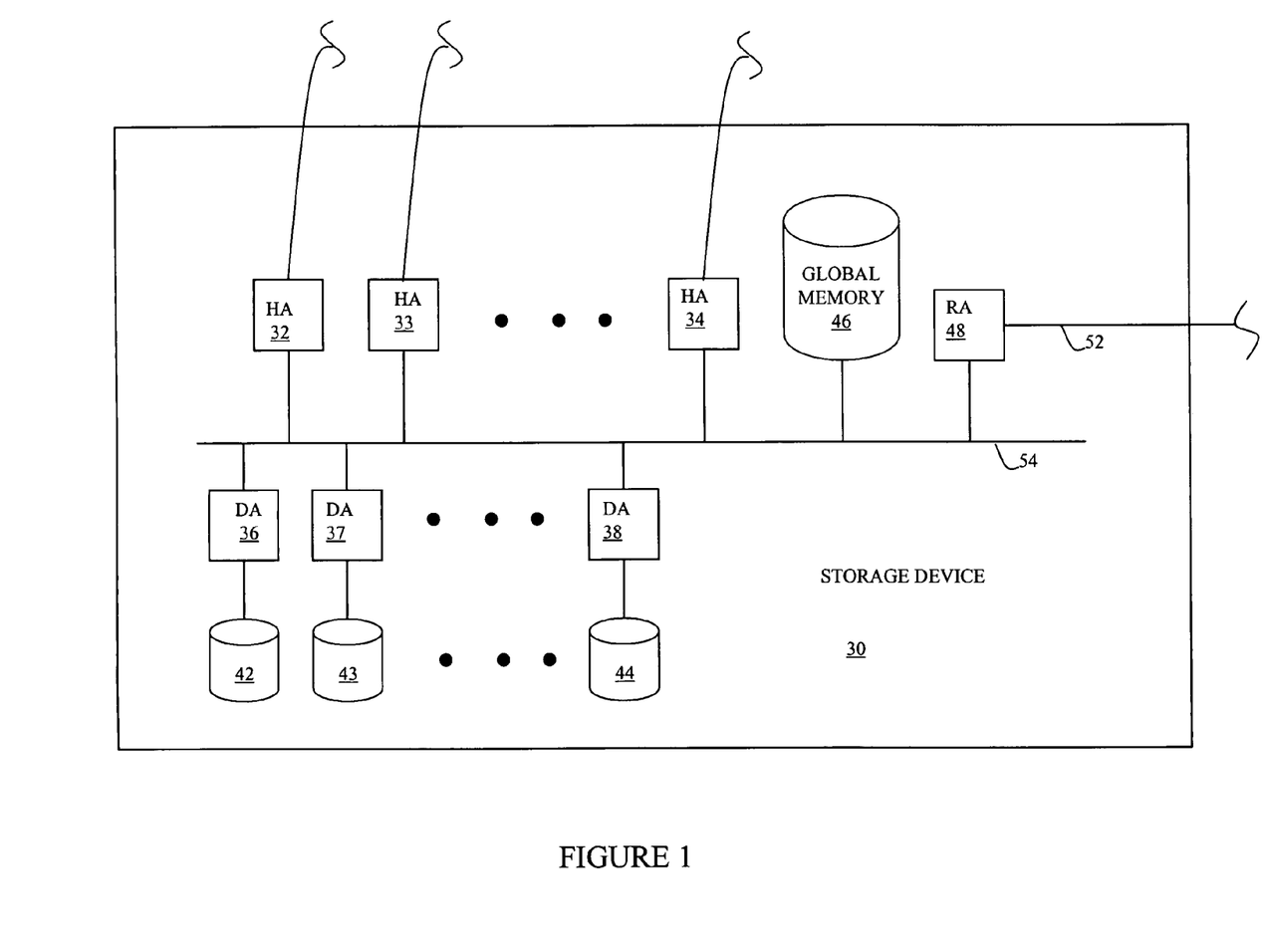
FIG. 1 is a diagram of a storage device used in connection with the system described herein.

Referring to FIG. 1, a storage device 30 includes a plurality of host adapters (HA) 32-34, a plurality of disk adapters (DA) 36-38 and a plurality of disk drives 42-44. Each of the disk drives 42-44 is coupled to a corresponding one of the DA's 36-38. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a datalink 52. The HA's 32-34, the DA's 36-38, the global memory 46 and the RA 48 are coupled to a bus 54 that is provided to facilitate communication therebetween.

Each of the HA's 32-34 may be coupled to one or more host computers (not shown) that access the storage device 30. The host computers (hosts) read data stored on the disk drives 42-44 and write data to the disk drives 42-44. The global memory 46 contains a cache memory that holds tracks of data from the disk drives 42-44 as well as storage for tables that may be accessed by the HA's 32-34, the DA's 36-38 and the RA 48.

Each of the HA's 32-34, the DA's 36-38, and the RA 48 may include a local processor and local memory to facilitate performing the functions thereof. For example, the RA 48 may include a local processor and local memory that handles requests made by one or more of the HA's 32-34 and/or the DA's 36-38 to transfer data via the datalink 52. Similarly, any one or more of the HA's 32-34 and/or the DA's 36-38 may receive data transfer requests. Since many such requests may be provided at or nearly at the same time, it is desirable to be able to process the requests concurrently in an orderly fashion. Accordingly, each of the HA's 32-34, the DA's 36-38, and the RA 48 may use an operating system to facilitate the orderly processing of tasks corresponding to the concurrent requests.

One of the services provided by an operating system is dynamically allocate and release blocks of memory for temporary use by one or more tasks. The memory allocation system disclosed herein may be used by the operating systems of one or more of the HA's 32-34, the DA's 36-38 and the RA 48 in connection with providing dynamic memory for use by tasks thereof. However, it will be appreciated by one of ordinary skill in the art that the memory allocation system disclosed herein has broad applicability to other operating systems and other types of software that dynamically allocate and release blocks of memory.

Figure 2:
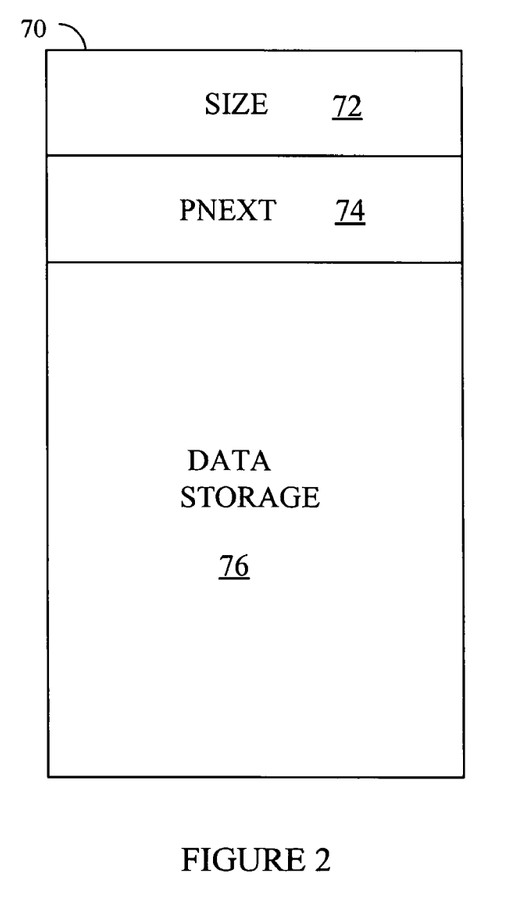
FIG. 2 shows a block of data used in connection with the system described herein.

Referring to FIG. 2, a block of memory 70 is shown as including a SIZE field 72, a PNEXT field 74 corresponding to a pointer to a next block of memory, and an area for storing data 76. As discussed in more detail elsewhere herein, the block 70 may have a particular fixed size, such as eight bytes. The SIZE field 72 represents how much data may be stored in the data storage area 76. Thus, for example, if the SIZE field 72 indicates that the block 70 contained thirty-two bytes, then the data storage area 76 would be thirty-two bytes in length. The PNEXT field 74 is used to link together unused blocks of the same size and is discussed in more detail elsewhere herein.

The system disclosed herein contemplates a plurality of blocks of memory of various sizes. For example, there may be a plurality of blocks that have an eight byte data storage area, a plurality having a sixteen byte data storage area, a plurality having a twenty-four byte data storage area, etc. The maximum size of the data storage area could be any amount such as, for example, 10 k. The incremental difference between successive block sizes, and the maximum block size, could be any value and may be set according to the needs of the operating system and corresponding tasks. It is possible to have the incremental difference between successive block sizes be one byte.

A task may request a block of a particular size and receive the block 70 shown in FIG. 2. Note that, in the example herein of having the incremental difference between successive block sizes be eight bytes, a task that requests an amount of storage that is not a multiple of eight bytes would receive the next higher size. For example, a task that requests one byte of memory would receive an eight byte block. A task that requests twelve bytes of memory would receive a sixteen byte block, etc. Note further, however, that, in the example herein, a task that requests an amount of memory that is a multiple of eight bytes would receive a block having a storage area that is that size. For example, a task requesting thirty-two bytes of memory would receive a thirty-two byte block.

Figure 3:
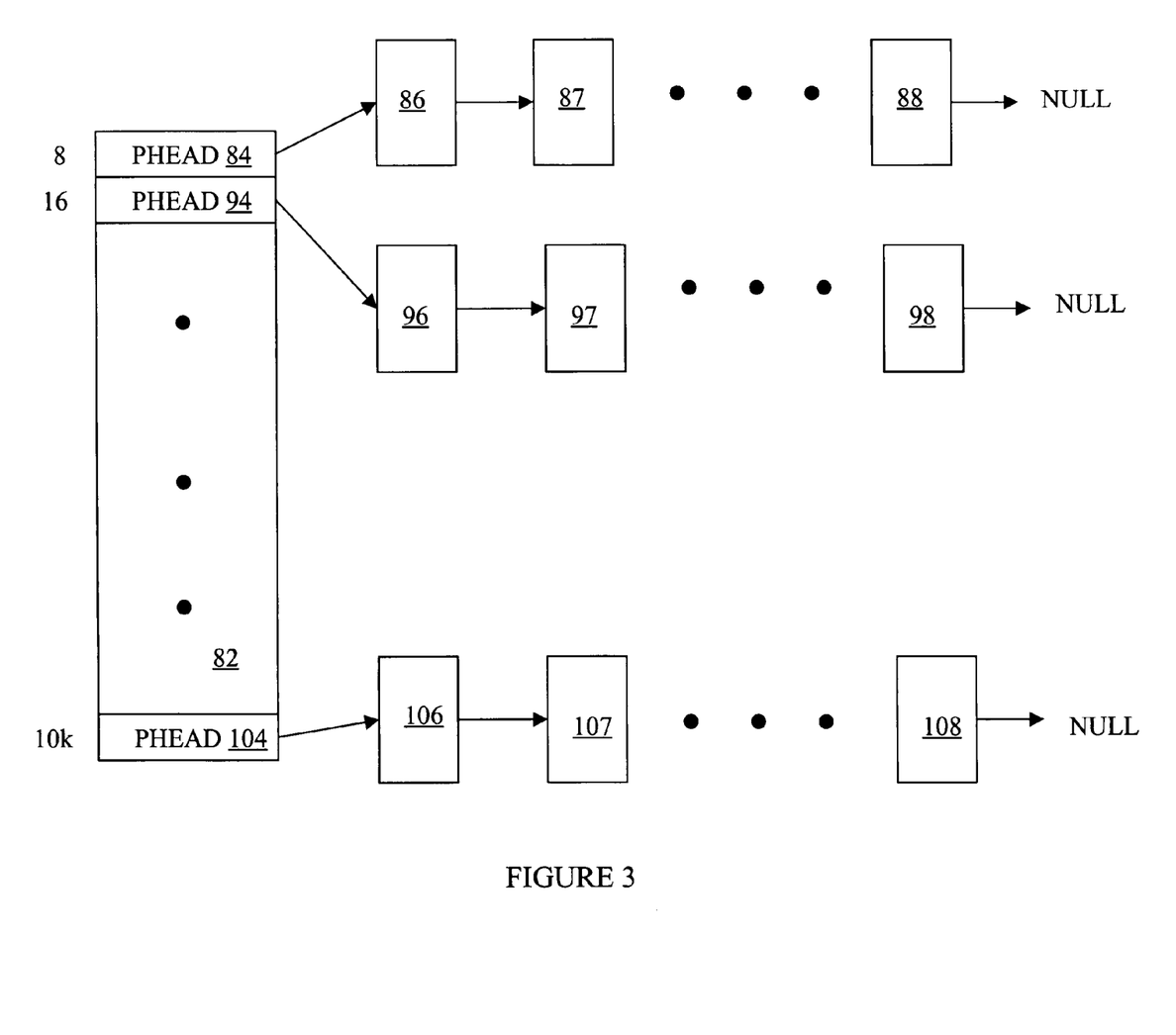
FIG. 3 shows a table and a plurality of linked lists used for managing free buckets of memory according to the system described herein.

Referring to FIG. 3, a table 82 for memory blocks having the same size is illustrated. The table 82 contains a plurality of list pointers, PHEAD 84, PHEAD 94, PHEAD 104, that represent heads of linked lists of unused blocks of memory having the same size. Thus, for example, if the block sizes are multiples of eight bytes going from eight bytes as a minimum bucket size to 10 k as a maximum bucket size, the table 82 could contain a head pointer PHEAD 84 for a linked list of unused blocks of memory 86-88 containing eight bytes of storage space. The table 82 may also contain a head pointer PHEAD 94 of a linked list of unused blocks 96-98 containing sixteen bytes of storage space and may contain a head pointer PHEAD 104 of a linked list of unused blocks 106-108 containing 10 k bytes of storage space. Of course, the table 82 may also contain head pointers for lists of unused blocks in sizes between sixteen and 10 k bytes.

The linked lists are constructed by having each of the unused blocks use the PNEXT field (discussed above in connection with FIG. 2) to point to the next unused block of the same size in the list. Thus, for example, the PNEXT field of the block 86 points to the unused block 87 and the PNEXT field of the unused block 87 points to the block 88. The PNEXT field of the block 88 points to the null pointer (as do the PNEXT fields of the buckets 98, 108) to indicate the end of the linked list. Each of the head pointers 84, 94, 104 together with the corresponding blocks of memory for each constitutes a "bucket" of memory blocks all having the same size. In some embodiments, the table 82 may be placed in memory that is faster than the memory used for the blocks of data.

Figure 4:
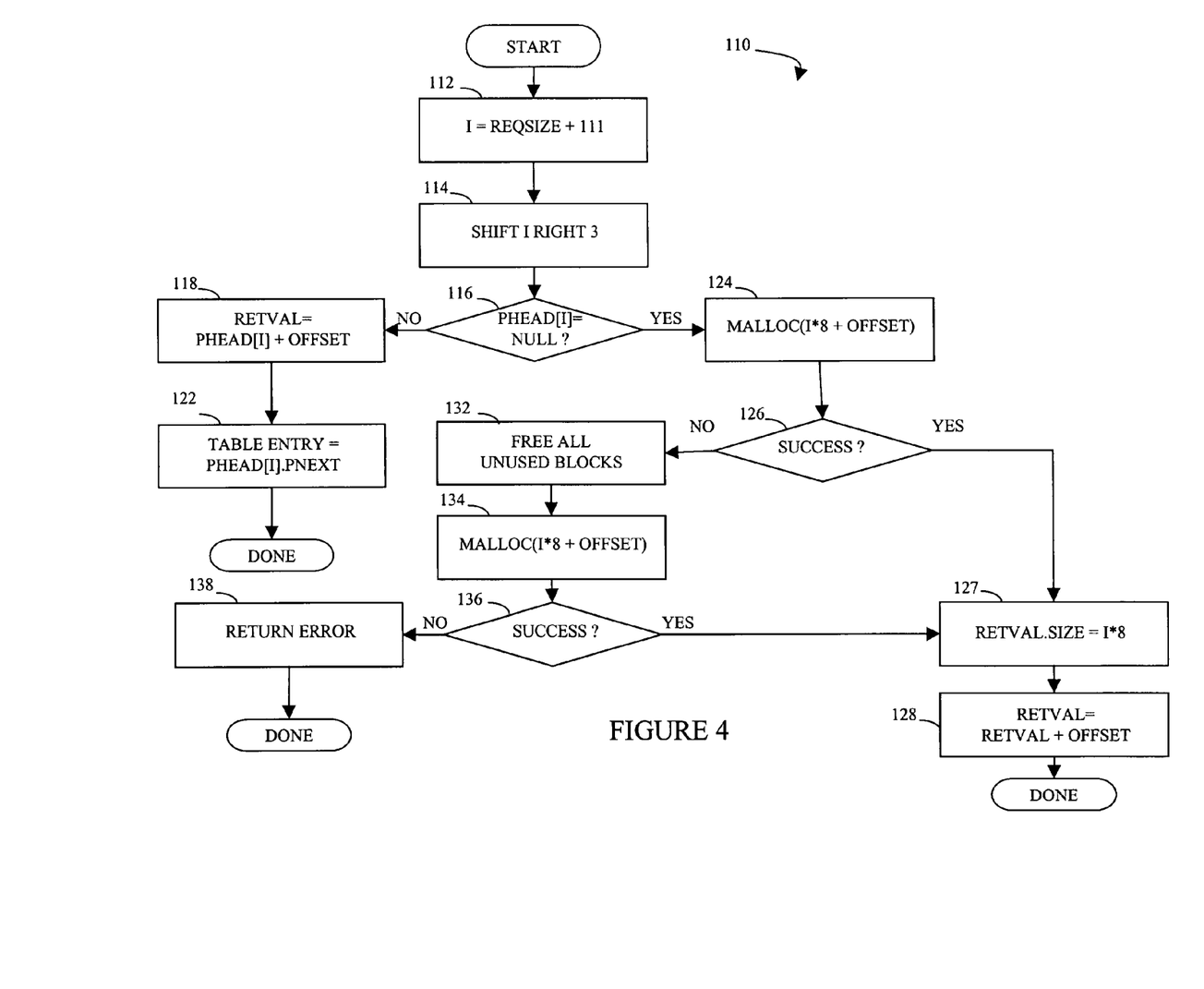
FIG. 4 is a flow chart showing steps performed in connection with a request for a block of memory according to the system described herein.

Referring to FIG. 4, a flowchart 110 illustrates steps performed in connection with an application requesting an amount of memory. The flowchart 110 assumes that the buckets are provided in multiples of eight bytes beginning with the smallest size of eight bytes. Processing begins at a first step 112 where an index variable, I, is set to the sum of the requested size of the amount of memory (REQSIZE) and digital 111(7). As discussed in more detail below, the index variable I will be used to index a table such as the table 82 illustrated in FIG. 3. Following the step 112 is a step 114 where the index variable, I, is shifted right three times. The effect of the steps 112, 114 is to properly index the table 82 to obtain the next highest size block for requests for amounts of memory that are not a multiple of eight bytes while, at the same time, obtaining a block size that is identical to the amount of memory needed when the requested amount of memory is a multiple of eight. For example, if a task requests one byte, then the result of adding seven at the step 112 is eight. Shifting that value right three places at the step 114 results in an index table of one meaning that the entry corresponding to eight byte blocks (e.g., PHEAD 84 of the table 82) will be accessed. As another example, if the number of requested bytes is eight, then the result of adding seven at the step 112 is fifteen. However, shifting fifteen right three times at step 114 results in the index variable, I, also being one, thus correctly providing an unused block having eight bytes of storage.

Following the step 114 is a step 116 where it is determined if the pointer in the table 82 points to null, meaning that there are no unused blocks corresponding to the requested amount of memory. If the pointer at the head of the table 82 does not point to null, meaning that there are available unused blocks corresponding to the requested size, then control transfers from the step 116 to a step 118 where the return value, RETVAL, which is a pointer to the requested block of memory, is set to be equal to PHEAD[I] (the pointer at the head of the linked list of unused blocks indexed in the table 82 by I) plus a value of OFFSET, which is the offset corresponding to the SIZE and PNEXT fields of the block pointed to by PHEAD[I]. The OFFSET value may be added to prevent the task that requests the block of memory from overwriting the SIZE field of the block when the block of memory is used. Other techniques may also be employed, such as having a separate list of used blocks that include the size of each used bucket.

Following the step 118 is a step 122 where the head of the list is modified to reflect the fact that the first item on the list of unused blocks is now being used by a task, and thus is no longer an unused block. Following the step 122, processing is complete.

If it is determined at the test step 116 that the head pointer of the linked list of unused blocks points to null, meaning that there are no unused blocks having a size corresponding to the requested amount of memory, then control transfers from the step 116 to a step 124 where memory is requested from the heap. The request at the step 124 may be performed by using a conventional memory heap request routine, such as malloc. Note also that the amount of memory requested at the step 124 may be the index, I, multiplied by eight (shifted left three times) plus the OFFSET, which corresponds to the amount of memory space used by the SIZE field and the PNEXT field. Thus, the requested memory may be converted into a block that, when freed, may be returned to the appropriate linked list of unused blocks rather than being returned to the heap. In an embodiment disclosed herein, a single heap is used for the blocks of memory that correspond to the table 82.

Following the step 124 is a test step 126 where it is determined if the memory requested at the step 124 was successful. If so, then a step 127 where the SIZE field of the block of memory obtained from the heap is set to the index, I, times eight (i.e., I shifted left three times). The value placed in the SIZE field corresponds to the size of the block that is being created and will be used when the task that requested the memory returns the block to the appropriate list of unused blocks. Following the step 127 is a step 128 where the return value, RETVAL, is adjusted in a manner similar to that discussed above in connection with the step 118. Following the step 128, processing is complete.

If it is determined at the step 126 that the request for a block of memory from the heap at the step 124 was unsuccessful, then control passes from the step 126 to a step 132 where all of the unused blocks of memory from the table 82 are returned to the heap memory. Freeing the memory corresponding to the unused buckets at the step 132 is discussed in more detail hereinafter.

Following the step 132 is a step 134 where the request for an appropriate block of memory from the heap, similar to the request presented at the step 124, is made. Note, however, that since the step 134 follows the step 132 where all memory corresponding to the unused blocks was returned to the heap, it is more likely that the step 134 will successfully be able to provide the requested block of memory, since freeing all the memory corresponding to unused blocks at the step 132 should increase the amount of heap memory available. Following the step 134 is a test step 136 where its determined if the memory requested at the step 134 was successful. If so, then control transfers from the step 136 to the step 127, discussed above. Otherwise, control transfers from the step 136 to a step 138 where an error is returned. Returning the error at the step 138 indicates that the memory request by the task cannot be filled either with a block of memory from the table 82 or with memory from the heap. Following step 138, processing is complete.

Figure 5:
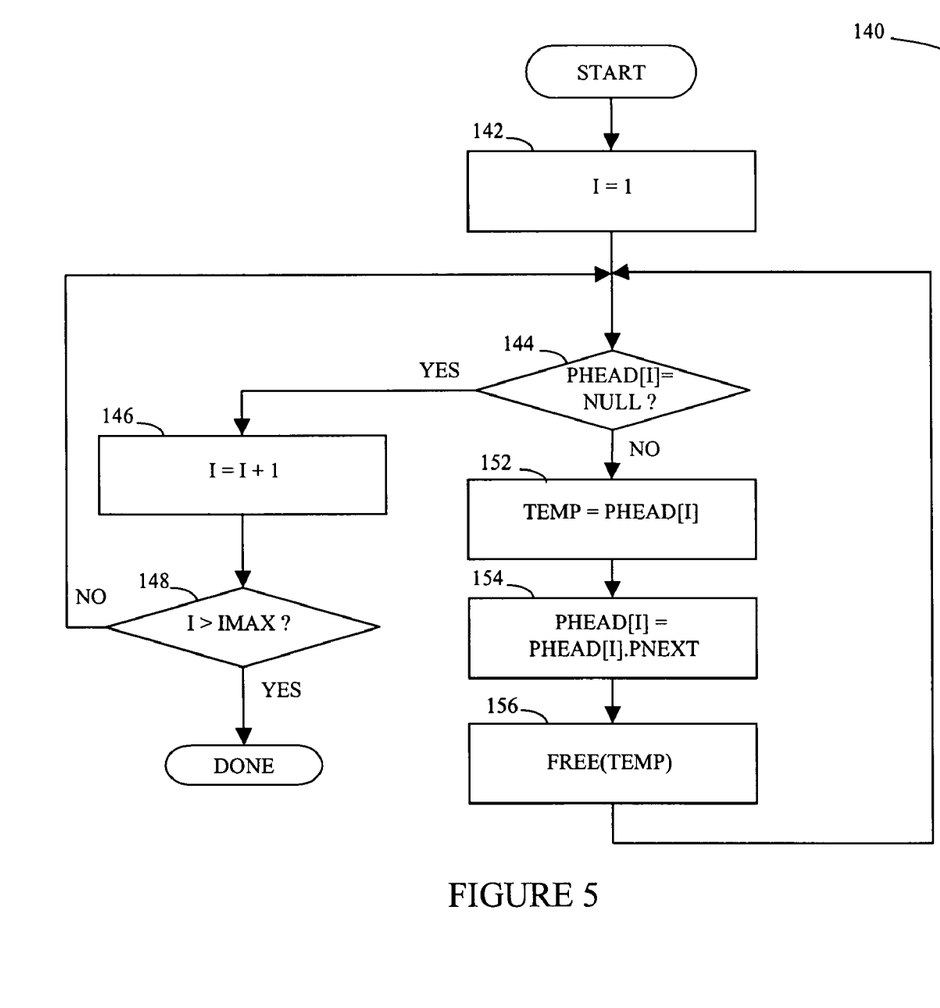
FIG. 5 is a flow chart illustrating steps performed in connection with returning all free buckets of memory back to a heap according to the system described herein.

Referring to FIG. 5, a flow chart 140 illustrates steps performed in connection with freeing all the unused blocks at the step 132 of FIG. 4. Processing begins at a first step 142 where an index, I, is set to one. The index I is used to index the table 82 that contains the list head pointers for all of the lists of unused blocks.

Following the step 142 is a test step 144 where it is determined if PHEAD [I] equals null. The test at the step 144 determines if the head pointer of a linked list of unused blocks of a particular size (the linked list corresponding to the index I) equals null. If so, then all of the free blocks corresponding to the particular size have been returned and control transfers from the step 144 to a step 146 where the index, I, is incremented. Following the step 146 is a test step 148 where it is determined if the index, I, is greater than the number of entries in the table, IMAX. If so, then processing is complete. Otherwise, control transfers from the step 148 back to the step 144 for the next iteration that processes the next entry in the table.

If it is determined at the test step 144 that the list head pointer PHEAD [I] does not equal null, then control transfers from the step 144 to a step 152 where a temporary variable, TEMP, is set to equal to PHEAD[I]. Following the step 152 is a step 154 where the head of the list is adjusted to be equal to the next unused block in the list by setting PHEAD[I] equal to PHEAD[I].NEXT. Thus, for example, if the head of the list PHEAD 84 initially points to the bucket 86, then execution at the step 154 would cause the head of the list PHEAD 84 to point to the next block 87. Following the step 154 is a step 156 where the memory pointed to by TEMP is freed. Freeing the memory at the step 156 is performed in a conventional manner by, for example, calling a heap memory management routine that will free memory. Following the step 156, control transfers back to the test step 144.

Figure 6:
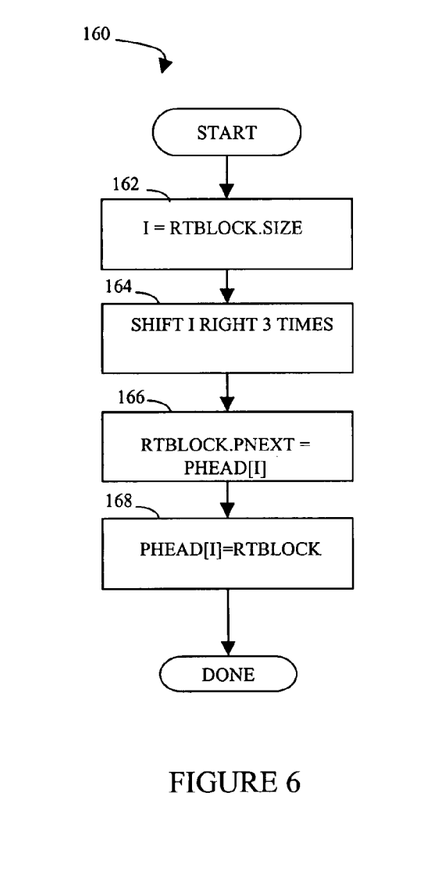
FIG. 6 is a flow chart illustrating steps performed in connection with returning a block of memory to the appropriate bucket according to the system described herein.

Referring to FIG. 6, a flow chart 160 illustrates steps performed in connection with returning a block (RTBLOCK) back to the table of unused blocks. Processing begins at a first step 162 where an index, I, is set equal to the size of the block being returned, which is found at the RTBLOCK.SIZE field. Following the step 162 is a step 164 where I is shifted right three times to obtain an index for the table 82. Following the step 164 is a step 166 where the NEXT field of the block being returned is set equal to the head of the linked list of blocks having the same size as the blocks being returned. Following the step 166 is a step 168 where the head of the linked list of blocks of the same size is set to point to the block being returned. Following step 168, processing is complete.

In an embodiment of the invention described herein, the table 82 of unused blocks may initially be empty, in which case then initial memory requests will result in obtaining memory from the heap and then returning the unused blocks to the table 82. Alternatively, it may be possible upon initialization to populate the table 82 with lists of unused blocks, as described below.

Figure 7:
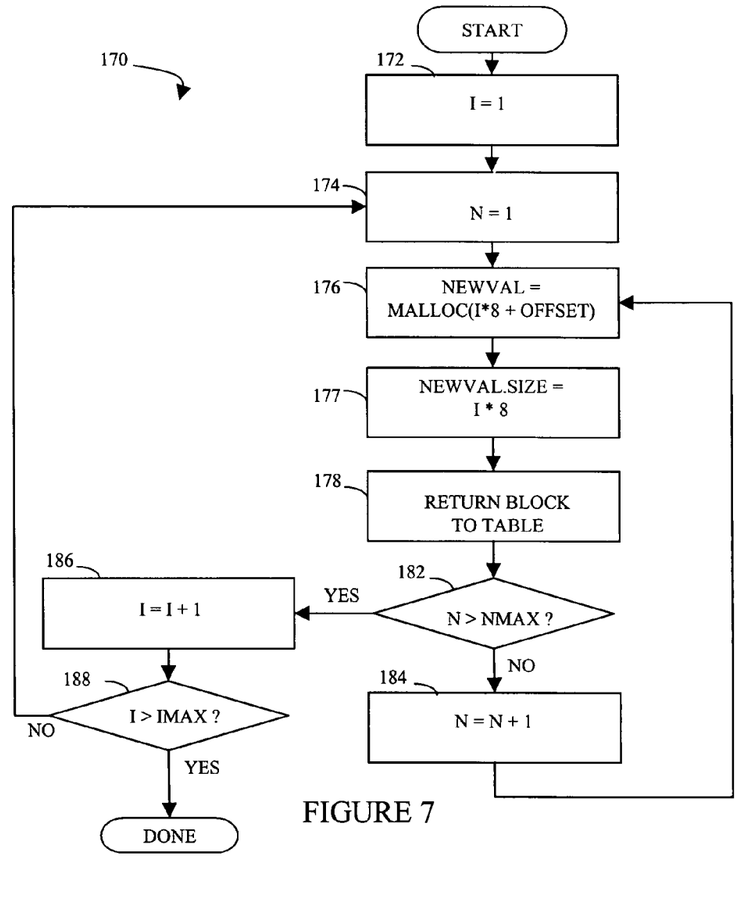
FIG. 7 is a flow chart illustrating steps performed in connection with initializing the buckets according to the system described herein.

Referring to FIG. 7, a flow chart 170 illustrates steps performed in connection with populating the table 82 with lists of unused blocks. Processing begins at a first step 172 where an index variable, I, is set to one. Following the step 172 is a step 174 where another index variable, N, is set equal to one. The index variable I represents the index in the table 82 of lists of different size blocks. The index variable N represents the number of free blocks of the same size placed on each list.

Following step 174 is a step 176 where a pointer to a block of memory, (labeled "NEWVAL" in the flow chart 170) is created by calling a conventional heap memory allocation routine, such as malloc, to allocate a number of bytes corresponding to the index I times eight plus the extra bytes (OFFSET) introduced by the SIZE field and the PNEXT field. Following the step 176 is a step 177 where the SIZE field of the new block of memory being created is set to equal I times eight. Note that the value I times eight may be obtained by shifting I left three bit positions.

Following the step 177 is a step 178 where the routine for returning unused blocks of memory is called for the new block just obtained. In an embodiment disclosed herein, the steps performed at the step 178 correspond to the flow chart 160 of FIG. 6. Following the step 178 is a test step 182 where N, the index that counts the number of unused blocks in each linked list of the same size blocks, is tested to determine if N is greater than NMAX, the maximum number of unused blocks provided on each list of the same size blocks. If not, then control transfers from the step 182 to a step 184 where N is incremented. Following the step 184, control transfers back to the step 176 to continue creating new blocks of memory.

If it is determined at the test step 182 that the value of N is greater than NMAX, (i.e., the number of unused blocks provided on each list of blocks of the same size), then control transfers from the step 182 to a step 186 where the index variable I is incremented. Following the step 186 is a test step 188 where it is determined if I is greater than IMAX, the maximum number of entries in the table 82. If so, then processing is complete. Otherwise, control transfers from the step 188 back to the step 174, discussed above.

Figure 8:
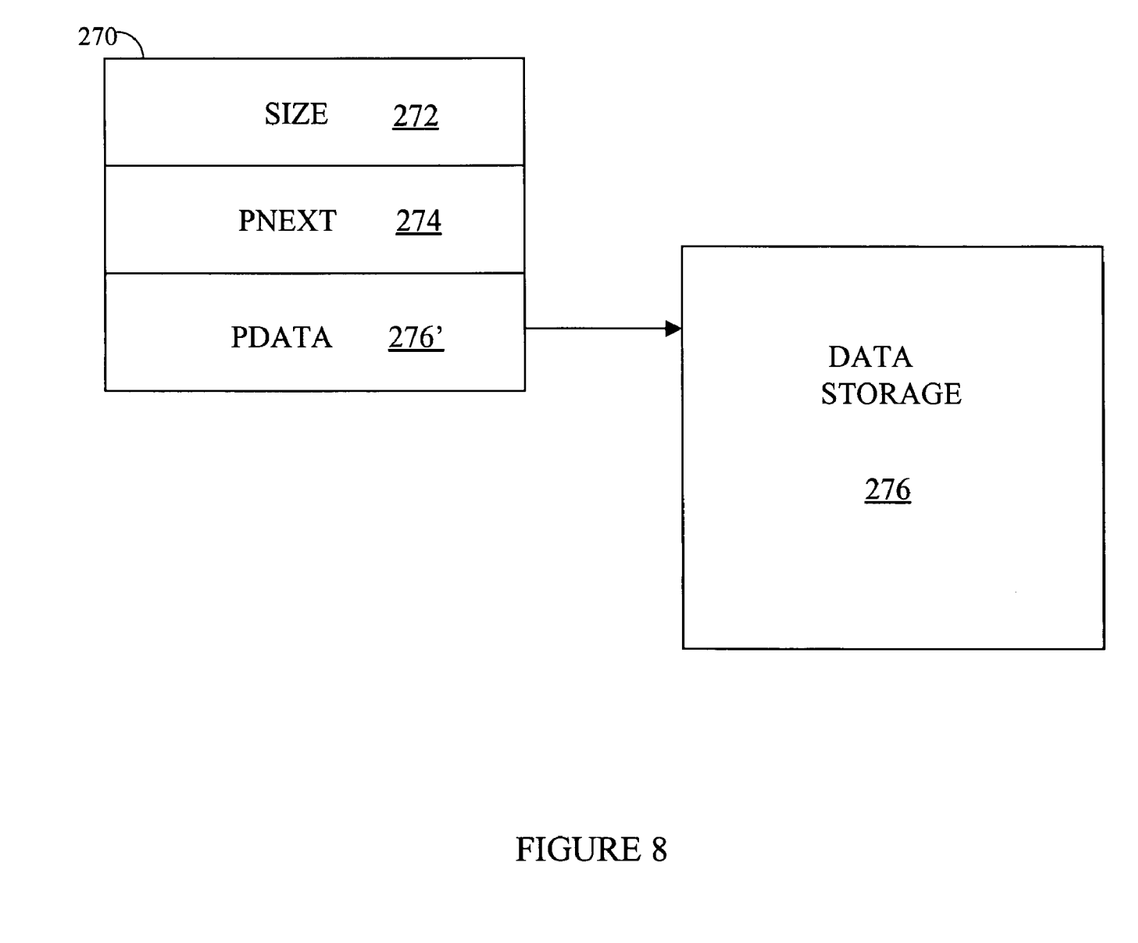
FIG. 8 shows a memory data structure according to another embodiment of the system described herein.

Referring to FIG. 8, an alternative embodiment of a memory structure 270 is shown as including a SIZE field 272, a PNEXT field 274 corresponding to a pointer to a next block of memory, and a PDATA field 276', which points to the data corresponding to the structure 270. The data for the structure 270 is provided by a data storage area 276. The SIZE field 272 and the PNEXT field 274 are like the SIZE field 72 and the PNEXT field 74 of the block 70 of FIG. 2. However, unlike the block 70 of FIG. 2, the structure 270 does not include the data with the structure 270. Instead, the structure 270 has a pointer to the data, PDATA 276', which points to the data storage area 276. In some embodiments, it may be possible that the structure 270 and the data storage area 276 are provided by different heaps, although it is also possible to use the same heap for both. In addition, it may be possible to have the data storage area 276 be provided in a faster (or slower) memory than the structure 270, thus allowing quicker access of the data storage area 276 (or structure 270). Of course, the table that contains the pointer to the structure 270 may also be provided in faster or slower memory.

Note also that the structure 270 and the data storage 276 may be accessed in parallel by parallel processors that access the structure 270 and the data storage area 276 at the same time. In other words, the structures and the data corresponding to the structures may be stored in separate memories that may be manipulated independently and in parallel. This may be advantageous for multi-processor/parallel processor architectures. Of course, it is also possible to have the structure 270 and the data storage area 276 reside in the same memory and be accessed by one processor, in series. Note that the table 82 of FIG. 3 can be used in connection with the structure 270 of FIG. 8 in the same way that the table 82 is used with the block 70 of FIG. 2.

Figure 9:
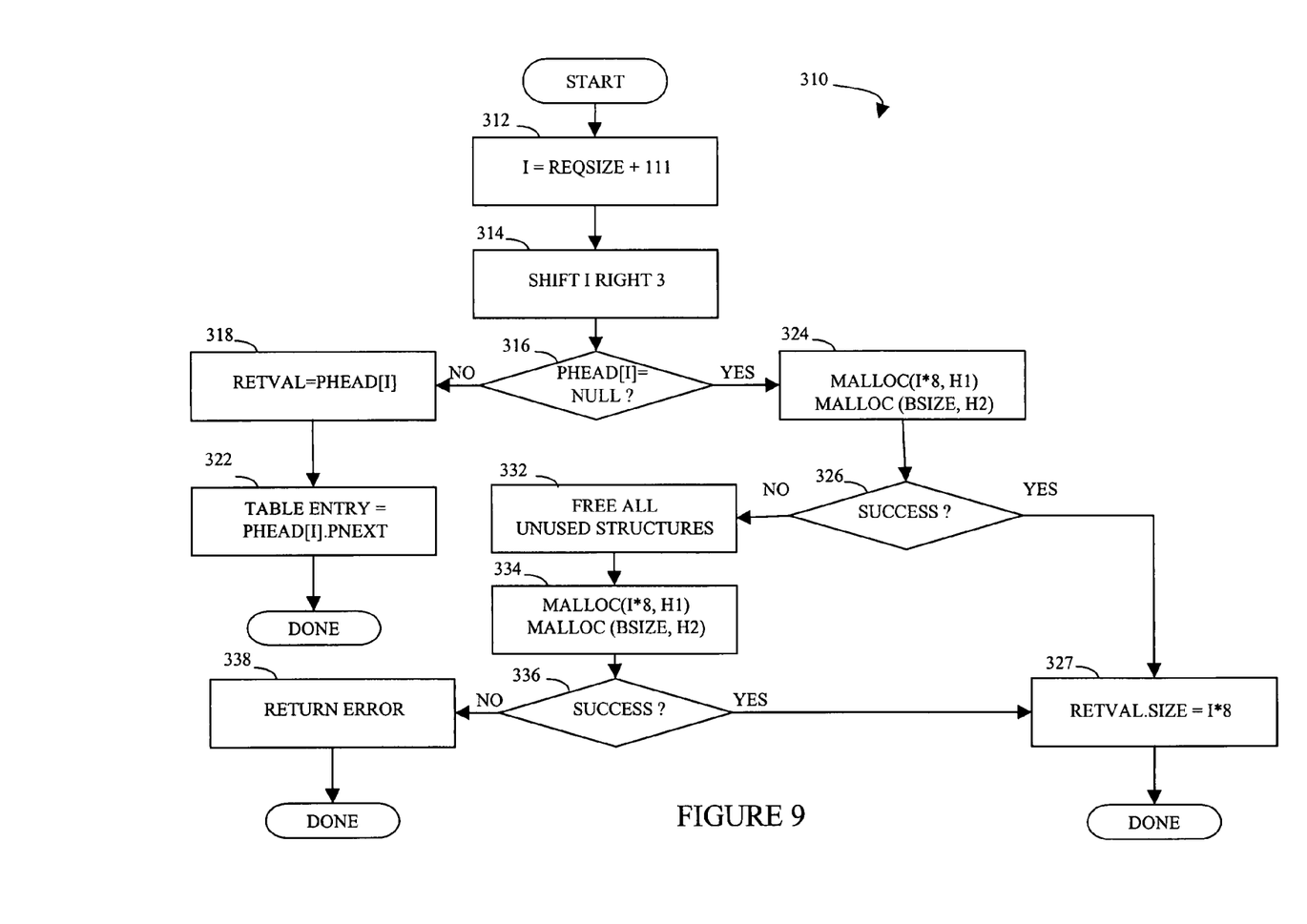
FIG. 9 is a flowchart showing steps performed in connection with a request for a block of memory according to another embodiment of the system described herein.

Referring to FIG. 9, a flowchart 310 illustrates steps performed in connection with an application requesting a block of memory using the structure 270 of FIG. 8. The flowchart 310 assumes that the blocks of memory are provided in multiples of eight bytes beginning with the smallest size of eight bytes. Processing begins at a first step 312 where an index variable, I, is set to the sum of the requested amount of memory (REQSIZE) and digital 111(7). As discussed in more detail below, the index variable I will be used to index a table such as the table 82 illustrated in FIG. 3. Following the step 312 is a step 314 where the index variable, I, is shifted right three times.

Following the step 314 is a step 316 where it is determined if the pointer at location I in the table 82 points to null, meaning that there are no unused structures corresponding to the requested size. If the pointer at the head of the table 82 does not point to null, meaning that there are available unused blocks of memory corresponding to the requested size, then control transfers from the step 316 to a step 318 where the return value, RETVAL, which is a pointer to the requested block of memory, is set to be equal to PHEAD[I] (the pointer at the head of the linked list of unused structures indexed in the table 82 by I). Note that, for an embodiment disclosed herein, the process that receives the pointer to a bucket (RETVAL) will use RETVAL.PDATA as a pointer to the data. Following the step 318 is a step 322 where the head of the list in the table is modified to reflect the fact that the first item on the list of unused structures is now being used, and thus is no longer an unused structure. Following the step 322, processing is complete.

If it is determined at the test step 316 that the head pointer of the linked list of unused structures points to null, meaning that there are no unused structures having a size corresponding to the requested block of memory, then control transfers from the step 316 to a step 324 where memory is requested from the heap(s). The request at the step 324 may be performed by using a conventional memory heap request routine, such as malloc. Note also that there are two memory requests at the step 324: a first request from heap H1 for memory for the structure and a second request from heap H2 for memory for the data storage area. As discussed above, the heaps H1 and H2 may correspond to different memories or the same memory. If the same memory is used for H1 and H2, then one heap (i.e., H1 or H2) may be used. In some embodiments, the storage for the structures may be preallocated, and thus only the memory for the data storage area needs to be allocated at the step 324. Also note that, in some embodiments, H1 and H2 could be the same heap.

Following the step 324 is a test step 326 where it is determined if the memory requested at the step 324 was successful. If so, then control passes to a step 327 where the SIZE field of memory for the data storage area is set to the index, I, times eight (i.e., I shifted left three times). The value placed in the SIZE field corresponds to the size of the data storage area associated with the structure that is being created and will be used when the task that requested the memory returns the memory to the table of unused blocks of memory. Following the step 327, processing is complete.

If it is determined at the step 326 that the request(s) for memory from the heap(s) at the step 324 were unsuccessful, then control passes from the step 326 to a step 332 where blocks of memory used by all the unused structures are returned to the heap memory. Freeing the memory corresponding to the unused structures at the step 332 is discussed above in connection with FIG. 5. Note, however, that, for the embodiment of FIGS. 8 and 9, the step 156 would also include a substep corresponding to freeing TEMP.PDATA prior to freeing TEMP.

Following the step 332 is a step 334 where the request for appropriate block(s) of memory from the heap(s), similar to the request presented at the step 324, is made. Note, however, that since the step 334 follows the step 332 where all memory corresponding to the unused structures was returned to the heap(s), it is more likely that the step 334 will successfully be able to provide the requested memory, since freeing all the memory corresponding to unused structures at the step 332 should increase the amount of heap memory available. Following the step 334 is a test step 336 where its determined if the memory requested at the step 334 was successful. If so, then control transfers from the step 336 to the step 327, discussed above. Otherwise, control transfers from the step 336 to a step 338 where an error is returned. Returning the error at the step 338 indicates that the memory request by the task cannot be filled either with a structure or with memory from the heap(s). Following step 338, processing is complete.

Figure 10:
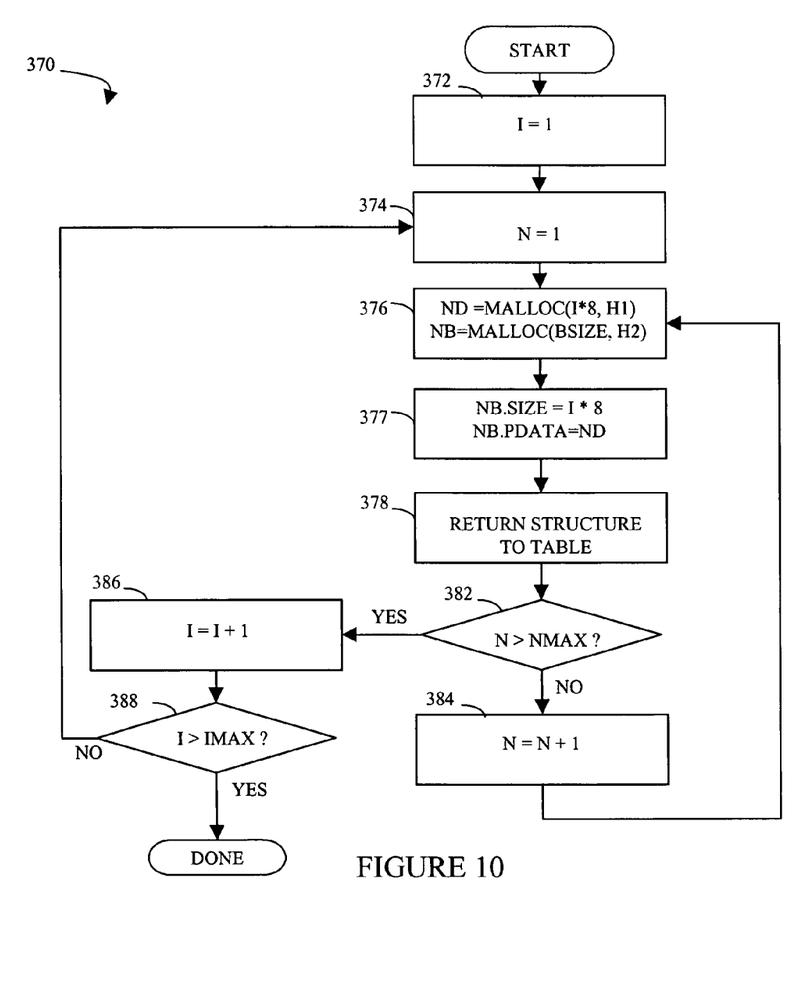
FIG. 10 is a flowchart illustrating steps performed in connection with initializing the buckets according to another embodiment of the system described herein.

Referring to FIG. 10, a flow chart 370 illustrates steps performed in connection with populating the table 82 with lists of unused structures in connection with the structure 270 of the embodiment of FIG. 8. Processing begins at a first step 372 where an index variable, I, is set to one. Following the step 372 is a step 374 where another index variable, N, is set equal to one. The index variable I represents the index in the table 82 of lists of structures corresponding to the same size data storage area (i.e. each bucket). The index variable N represents the number of free structures placed on each list.

Following step 374 is a step 376 where two pointers are created by calling a conventional heap memory allocation routine, such as malloc. The first pointer, ND, represents a pointer to a data storage area provided by the heap H1. The second pointer, NB, represents storage for the structure. The amount of memory allocated for ND is the index I times 8 (i.e., I shifted left three times). The amount of memory allocated for NB is the amount of memory taken up by a structure, which is constant for an embodiment disclosed herein. Following the step 376 is a step 377 where the SIZE field of the new structure being created is set to equal I times eight. Note that the value I times eight may be obtained by shifting I left three bit positions. Also at the step 377, the pointer NB.PDATA, which is the field of the structure that points to the data storage area, is set equal to ND.

Following the step 377 is a step 378 where the routine for returning unused memory to the table is called for the structure created by the previous steps. In an embodiment disclosed herein, the steps performed at the step 378 correspond to the flow chart 160 of FIG. 6. Following the step 378 is a test step 382 where N, the index that counts the number of unused structures in each linked list, is tested to determine if N is greater than NMAX, the maximum number of structures provided on each list corresponding to the same size data storage area. If not, then control transfers from the step 382 to a step 384 where N is incremented. Following the step 384, control transfers back to the step 376 to continue creating new structures.

If it is determined at the test step 382 that the value of N is greater than NMAX, (i.e., the maximum number of structures provided for each list), then control transfers from the step 382 to a step 386 where the index variable I is incremented. Following the step 386 is a test step 388 where it is determined if I is greater than IMAX, the maximum number of entries in the table 82. If so, then processing is complete. Otherwise, control transfers from the step 388 back to the step 374, discussed above.

While the invention has been disclosed in connection with various embodiments, modifications thereon will be readily apparent to those skilled in the art. Accordingly, the spirit and scope of the invention is set forth in the following claims.

What is claimed is:

1. A method of managing memory, comprising:
subdividing a first volatile memory into at least a first linked list of blocks corresponding to a first size and at least a second linked list of blocks corresponding to a second size that is greater than said first size, wherein data stored by each linked list of blocks is provided entirely in the first volatile memory, and wherein each of the at least first and second linked lists of blocks are linked lists of blocks wherein each block has a pointer to a different block of memory in which user data is stored;
providing, in a second volatile memory different from said first memory, a table that includes pointers that point directly to a first block of each of said linked lists, wherein the second volatile memory does not contain any linked lists of blocks provided in the first volatile memory;
in response to a request for an amount of memory that is less than or equal to the first size, providing a pointer to said first block of said first linked list of blocks and modifying said table to point to a remaining portion of said first linked list of blocks that does not include said first block;
in response to a request for an amount of memory that is greater than the first size and less than or equal to the second size, providing a pointer to said first block of said second linked list of blocks and modifying said table to point to a remaining portion of said second linked list of blocks that does not include said first block of said second linked list of blocks; and
in response to a request for an amount of memory corresponding to a particular linked list of blocks for which there are no unused blocks, requesting a first block of memory from a first heap for the particular one of the linked list of blocks and requesting a second block of memory from a second heap for a corresponding one of the different blocks of memory in which user data is stored.

2. A method, according to claim 1, wherein the first and second memories have different access rates.

3. A method, according to claim 1, wherein the entry for each linked list of blocks is a pointer to one of: said first block and null.

4. A method, according to claim 1, wherein the different block of memory has a different access time than memory used for the at least first and second linked lists of blocks.

5. A method, according to claim 1, wherein the first heap is different from the second heap.

6. A method, according to claim 1, wherein the first and second heaps are the same heap.

7. A method, according to claim 1, further comprising:
in response to there being no blocks of memory from both the first heap and the second heap corresponding to the request, returning all unused blocks of memory to the heaps.

8. A method, according to claim 7, further comprising:
following returning all unused blocks to the heaps, requesting a block of memory from the heaps.

9. A method of managing memory, comprising:
subdividing a first volatile memory into at least a first linked list of blocks corresponding to a first size and at least a second linked list of blocks corresponding to a second size that is greater than said first size, wherein user data stored by each linked list of blocks is provided entirely in the first volatile memory;
providing, in a second volatile memory different from said first memory, a table that includes pointers that point directly to a first block of each of said linked lists, wherein the second volatile memory does not contain any linked lists of blocks provided in the first volatile memory;
in response to a request for an amount of memory that is less than or equal to the first size, providing a pointer to said first block of said first linked list of blocks and modifying said table to point to a remaining portion of said first linked list of blocks that does not include said first block; and
in response to a request for an amount of memory that is greater than the first size and less than or equal to the second size, providing a pointer to said first block of said second linked list of blocks and modifying said table to point to a remaining portion of said second linked list of blocks that does not include said first block of said second linked list of blocks, wherein subdividing said first memory further includes subdividing said first memory into a plurality of linked lists of blocks, wherein each particular linked list contains blocks corresponding to one size that is different from that of blocks not in the particular linked list, wherein each set of blocks corresponds to a size that is a multiple of a predetermined value, wherein the predetermined value is $2^n$, where n is an integer, wherein the table includes one entry for each multiple of corresponding block sizes, and wherein the table is indexed by adding binary 111 to the amount of memory requested and then shifting the result right n places.

10. A method, according to claim 9, wherein the predetermined value is eight.

11. A method, according to claim 9, further comprising: in response to a request for an amount of memory corresponding to a particular linked list of blocks for which there are no unused blocks, requesting a block of memory from a heap.

12. A method, according to claim 11, further comprising: in response to there being no block of memory from the heap corresponding to the request, returning all unused blocks of memory to the heap.

13. A method, according to claim 12, further comprising: following returning all unused blocks to the heap, requesting a block of memory from the heap.

14. A method, according to claim 9, wherein the blocks contain a section in which user data is stored.

15. A computer program product, contained on a tangible computer-readable medium, comprising:
executable code that, when executed by a computer, subdivides a first volatile memory into at least a first linked list of blocks corresponding to a first size and at least a second linked list of blocks corresponding to a second size that is greater than said first size, wherein data stored by each linked list of blocks is provided entirely in the first volatile memory, and wherein each of the at least first and second linked lists of blocks are linked lists of blocks wherein each block has a pointer to a different block of memory in which user data is stored;
executable code that, when executed by a computer, provides, in a second volatile memory different from said first memory, a table that includes pointers that point directly to a first block of each of said linked lists, wherein the second volatile memory does not contain any linked lists of blocks provided in the first volatile memory;
executable code that, when executed by a computer, provides a pointer to said first block of said first linked list of blocks and modifies said table to point to a remaining portion of said first linked list of blocks that does not include said first block in response to a request for an amount of memory that is less than or equal to the first size; and
executable code that, when executed by a computer, provides a pointer to said first block of said second linked list of blocks and modifies said table to point to a remaining portion of said second linked list of blocks that does not include said first block of said second linked list of blocks in response to a request for an amount of memory that is greater than the first size and less than or equal to the second size;
executable code that, when executed by a computer, requests a first block of memory from a first heap for the particular one of the linked lists of blocks and requests a second block of memory from a second heap for a corresponding one of the different blocks of memory in which user data is stored in response to a request for an amount of memory corresponding to a particular linked list of blocks for which there are no unused blocks.

16. A computer program product, according to claim 15, wherein the first heap is different from the second heap.

17. A computer program product, according to claim 15, wherein the first and second heaps are the same heap.

18. A computer program product, according to claim 15, further comprising:
executable code that, when executed by a computer, returns all unused blocks of memory to the heaps in response to there being no blocks of memory from both the first heap and the second heap corresponding to the request.

19. A computer program product, according to claim 18, further comprising:
executable code that, when executed by a computer, requests a block of memory from the heaps following returning all unused blocks to the heaps.

20. A data storage device, comprising:
a plurality of disk drives;
a plurality of disk adapters coupled to the disk drives;
a volatile first memory coupled to the plurality of disk adapters;
a plurality of host adapters, coupled to the disk adapters and the first memory that communicate with host computers to send and receive data to and from the disk drives; and
at least one remote communications adapter that communicates with other storage devices, wherein at least one of the disk adapters, host adapters, and the at least one remote communications adapter includes an operating system that performs the steps of:
subdividing a first part of the first memory in at least a first linked list of blocks corresponding to a first size and at least a second linked list of blocks corresponding to a second size that is greater than said first size, wherein data stored by each linked list of blocks is provided entirely in the first volatile memory, and wherein each of the first and second linked lists of blocks contains a pointer to a different block of memory in which user data is stored;
providing, in a second volatile memory different from said first memory, a table that includes pointers that point directly to a first block of each of said linked lists, wherein the second volatile memory does not contain any linked lists of blocks provided in the first volatile memory;
in response to a request for an amount of memory that is less than or equal to the first size, providing a pointer to said first block of said first linked list of blocks and modifying said table to point to a remaining portion of said first linked list of blocks that does not include said first block; and
in response to a request for an amount of memory that is greater than the first size and less than or equal to the second size, providing a pointer to said first block of said second linked list of blocks and modifying said table to point to a remaining portion of said second linked list of blocks that does not include said first block of said second linked list of blocks;

in response to a request for an amount of memory corresponding to a particular linked list of blocks for which there are no unused blocks, the operating system requests a first block of memory from a first heap for the particular one of the linked list of blocks and requests a second block of memory from a second heap for a corresponding one of the different blocks of memory in which user data is stored.

* * * * *